Patented May 30, 1939

2,160,503

UNITED STATES PATENT OFFICE 2,160,503

BLOOD STANCHER

Willy O. Herrmann, Deisenhofen, Germany, assignor to Chemische Forschungsgesellschaft, m. b. H., Munich, Germany, a corporation of Germany No Drawing. Application February 3, 1937, Serial No. 123,852. In Germany February 14, 1936

6 Claims. (Cl. 167—58)

This invention relates to blood stanchers and has for its object to provide new and improved means for preventing bleeding in the human or animal system.

Heretofore certain natural colloids such as pectin and other vegetable substances have been used as carriers or substrates in the manufacture of stanchers or agents intended to prevent bleeding, which agents have taken the form of powders, films and the like. Such substances, however, have the disadvantage that it is impossible to secure any uniformity in the product because of the natural variation in content of the various pectins and vegetable substances derived from different sources or even among substances derived from the same source. For example, pectins obtained from different kinds of fruits or vegetables vary widely in characteristics. The pectins also vary in accordance with the climate, the degree of maturity of the fruit, and the geographic points from which the materials are obtained. They also vary from year to year in the same locality. Such variations are still further increased by the great number of extracting methods used in obtaining the pectin; by the difference in age or time of storage of the material; or by the various techniques used in the manufacture. For these reasons it has been impossible to obtain any reasonable degree of uniformity in the product.

In accordance with the present invention an absolutely uniform product is obtained which may be duplicated at any time or in any locality. Furthermore, the properties may be arbitrarily varied as desired in order to obtain any required product. This is accomplished by utilizing a water-soluble polymerized vinyl compound or a compound of this type which is capable of swelling in water, particularly polymerized vinyl alcohols and their partial esters, acetals, ethers, ester-acetals or mixtures thereof. Such synthetic substances can be made by definite processes which can be exactly repeated from time to time so as to provide a product having constant properties, that is, degree of polymerization, viscosity, dissolving power, absorption capacity, escharotic effect, degree of purity, etc. Such properties remain unaltered for long periods of time and permit the development of an exact, simple and commercially successful method of obtaining the desired product. Furthermore, the preparation of the stanchers when using the above-mentioned polymerized vinyl compounds is simplified and it is possible to obtain the desired sterility thereof.

Polymerized vinyl compounds can be precipitated in the form of a fine sterile powder from reaction mixtures or from solutions. This powder may be applied to the body, with or without the addition of appropriate substances such as iodoform, iron-perchloride, etc., as a sterile stanching vulnerary powder. The powder has stanching properties itself but it may also be used as a carrier for other medicaments having the desired stanching or other properties.

Furthermore, the polymerized vinyl compounds can easily be obtained in the form of emulsions, pastes, ointments, creams, suppositories, and the like, which do not separate out and can easily be re-sterilized. For this reason manifold surgical applications are made possible. By combining the same with ingredients usually employed for burns, special ointments for this purpose can be obtained. Soap containing emulsions prepared with the use of polymerized vinyl alcohol imparts a desirable stanching effect to shaving cream.

Solutions of polymerized vinyl alcohol and of its water soluble derivatives form, when applied to minor wounds, a plaster which rapidly stanches bleeding. The affinity of such substances for substances of other kinds also makes possible the incorporation of additions of every description with corresponding desirable therapeutic effects.

It is also possible to produce thin films of my solutions combined with other appropriate additions having corresponding therapeutic effects. Such films may be used as stanching plasters which are susceptible of being re-sterilized at any time. By the addition of plasticizers, such as glycerine or glycol, the softness and flexibility of the film can be adapted to the particular use in question. Also, plasters having other characteristics, such as vulnerary bandages, can be impregnated with solutions of polymerized vinyl alcohol or its water soluble derivatives, or the polymeric compounds can be applied thereto either as a powder or by means of adhesives.

By the process of pressing, spraying or spinning, these polymerized vinyl compounds can be made into the form of suppositories of various types including rectal suppositories and others which may be introduced into bleeding cavities of the body and into wounds. Such substances can be made to have any desired degree of elasticity and flexibility as by pasting them with polymerized vinyl alcohol and aqueous glycerine and by compressing or squeezing the same out of nozzles or the like.

Sterile injection liquids can be produced from the above solutions, for example, by dissolving the same in Ringer's solution. Owing to the inertness of polymerized vinyl alcohol for a series of different substances, and because of its stability at high temperatures, no difficulty is involved in making this solution. It has even been found that copious doses of polymerized vinyl alcohol have no detrimental effect when used in the form of intravenous as well as intramuscular or subcutaneous injections.

Experiments with animals have shown that polymerized vinyl alcohol taken "per os" not only is absolutely harmless but partially enters the circulation of the blood. Accordingly, polymerized vinyl alcohol can be used in the form of medical solutions and can also be taken internally in the form of powders, capsules, pills or tablets for the purpose of remedying bleeding in this way.

A few examples of the use of polyvinyl compounds having blood stanching properties follow:

Example 1

For a period of eight days 20 cubic centimeters a day of a 10% solution of polymeric vinyl alcohol in Ringer's liquid were applied intravenously to a dog.

Example 2

A dog was treated for fourteen days with intramuscular injections of 2 grams daily of polymeric vinyl alcohol 5% dissolved in Ringer's liquid.

Example 3

A dog was treated for ten days with 2 grams daily of the material described in Example 2. None of the dogs so treated showed any harmful after-effect. The dogs were kept partially under observation for several months after treatment, but no injury to their health could be noted.

Example 4

Over a period of thirty days a rabbit was given 15 grams of the material described in Example 2 in the form of subcutaneous injections. Two weeks after the last injection the rabbit was killed and the liver, the milt and the kidney were subjected to a histological investigation. No pathological alterations of the organs could be detected.

It is to be noted from the above that preparations which are capable of fulfilling a variety of different requirements can be made in any form desired by a simple technical manipulation, thereby providing a large number of valuable media for medicinal uses in an extremely satisfactory technical manner.

I claim:

1. Stanching and bleeding preventing remedies for external application to wounds, injection or oral administration containing a polymeric vinyl compound capable of swelling in water.

2. Stanching and bleeding preventing remedies for external application to wounds, injection or oral administration containing a polymeric vinyl alcohol.

3. Stanching and bleeding preventing remedies for external application to wounds, injection or oral administration containing a polymeric vinyl alcohol and a stanching substance.

4. Stanching and bleeding preventing remedies for external application to wounds, injection or oral administration containing at least one polymeric vinyl derivative which is capable of swelling in water, and a stanching substance.

5. A blood stancher comprising a readily flowable or spreadable material containing a polymeric vinyl compound capable of swelling in water.

6. A blood stancher comprising a sterile powder containing a polymeric vinyl compound capable of swelling in water.

WILLY O. HERRMANN.